United States Patent
Noland et al.

(10) Patent No.: US 7,293,134 B1
(45) Date of Patent: Nov. 6, 2007

(54) SYSTEM AND METHOD FOR AN ENHANCED SNAPSHOT POINTER

(75) Inventors: Thomas Nelson Noland, Boulder, CO (US); Charles A. Milligan, Golden, CO (US); Leslie K. Hodge, Westminster, CO (US)

(73) Assignee: Storage Technology Corporation, Louisville, CO (US)

( * ) Notice: Subject to any disclaimer, the term of this patent is extended or adjusted under 35 U.S.C. 154(b) by 415 days.

(21) Appl. No.: 11/026,077

(22) Filed: Dec. 30, 2004

(51) Int. Cl.
*G06F 12/00* (2006.01)
(52) U.S. Cl. .................... 711/111; 711/202; 707/10
(58) Field of Classification Search ............... 711/111, 711/112, 202; 707/10
See application file for complete search history.

(56) References Cited

U.S. PATENT DOCUMENTS

| | | | | |
|---|---|---|---|---|
| 5,758,334 A | * | 5/1998 | Knight et al. | 707/2 |
| 7,010,553 B2 | * | 3/2006 | Chen et al. | 707/203 |
| 2003/0059007 A1 | * | 3/2003 | Beyda | 379/88.19 |

* cited by examiner

*Primary Examiner*—Woo H. Choi
(74) *Attorney, Agent, or Firm*—Brooks Kushman P.C.

(57) ABSTRACT

A system and method are disclosed for providing an enhanced snapshot copy pointer. A data element is stored in a first storage subsystem in the data processing system. A first pointer is created in a pointer table in the first storage subsystem. The first pointer includes an address of the data element. A second pointer is created in the pointer table in the first storage subsystem. The second pointer includes an address of the first pointer.

18 Claims, 10 Drawing Sheets

SYSTEM AND METHOD FOR AN ENHANCED SNAPSHOT POINTER

BACKGROUND OF THE INVENTION

1. Technical Field

The present invention provides a system and method for managing data updates in a hierarchy of virtual copies of data. More specifically, the present invention provides a mechanism for providing an enhanced snapshot pointer.

2. Description of Related Art

In known storage subsystems that make use of instant copy operations, such as the Snapshot instant copy mechanism available from Storage Technology, Inc., data files are received from a processor and stored in back-end data storage devices by mapping the processor assigned data file identifier to a logical address that identifies the physical storage location of the data. This mapping allows instant copies of data files by creating duplicate data file pointers that reference the original data files. In this dynamically mapped virtual data storage system, the data files are referred to as a collection of "virtual tracks" and each data file is identified by unique virtual track addresses (VTAs).

Using an instant copy mechanism, such as the Snapshot instant copy mechanism, may result in many copies of the same set of pointers, i.e. a subset of the pointer table, being used in a storage subsystem. It is useful to manage these various copies of the pointers so that changes to data tracks associated with pointers in a pointer table are passed along to appropriate copies of the pointers.

Although the snapshot copy technology has eased some of the difficulty in managing data, particularly difficulties involving resource consumption due to duplicated data, the current technology is not well adapted to managing data across space. The snapshot technology is not efficient when attempting to manage data throughout a distributed environment.

Thus, the present invention is a method and system that provides an enhanced snapshot pointer that includes multiple different flags that indicate whether the enhanced pointer points directly to data or to another pointer, whether the enhanced pointer points to a local or remote location, and whether the enhanced pointer includes additional data.

SUMMARY OF THE INVENTION

A system and method are disclosed for providing an enhanced snapshot copy pointer. The enhanced pointer includes a pointer address. When the enhanced pointer is a prime pointer (PP) type of pointer, the enhanced pointer points directly to the data itself. When the enhanced pointer is an enhanced pointer (EP) type of pointer, the enhanced pointer points to another pointer instead of to data. Each enhanced pointer includes a pointer address. When the enhanced pointer is an EP type of pointer, the pointer address will be an address of another pointer. When the enhanced pointer is a PP type of pointer, the pointer address will be an address of the data itself.

Two subsets of a large dataset can be created where the subsets do not reside in the same physical subsystem. Each subset is located in its own separate subsystem. Each subsystem has its own physical storage device and pointer table. Two different instances of an application exist. Each instance runs locally on one of the subsystems. To an end user, all of the data appears to be local.

Each data element physically stored in a physical device will have a prime pointer (PP) type of pointer that points directly to the storage location in the physical device. In addition, other type of pointers may be used. An enhanced pointer (EP) type of pointer points to another pointer in either the local subsystem or another pointer in the remote subsystem. As a data element is initially written to a physical storage location, an anchor pointer is created in the pointer table. This anchor pointer is then used as a static entry point to the data element. The location of the anchor pointer within the pointer table is not changed once the anchor pointer is created as long as the valid data element is stored in the physical device.

When a subsystem receives a request to access data, the subsystem reads its pointer table to find an entry to use to locate the data. If a PP type of pointer is found, it is used to locate the data locally in the subsystem. If an EP type of pointer is found, it is used to locate an anchor pointer in a remote subsystem. The anchor pointer is then used by the remote subsystem to locate the PP type of pointer in the remote subsystem to use to locate the data.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

The present invention describes a method for managing data through the use of metadata. The present invention may be implemented in a stand alone computing device or in a distributed computing environment, such as a network.

Figure 1:
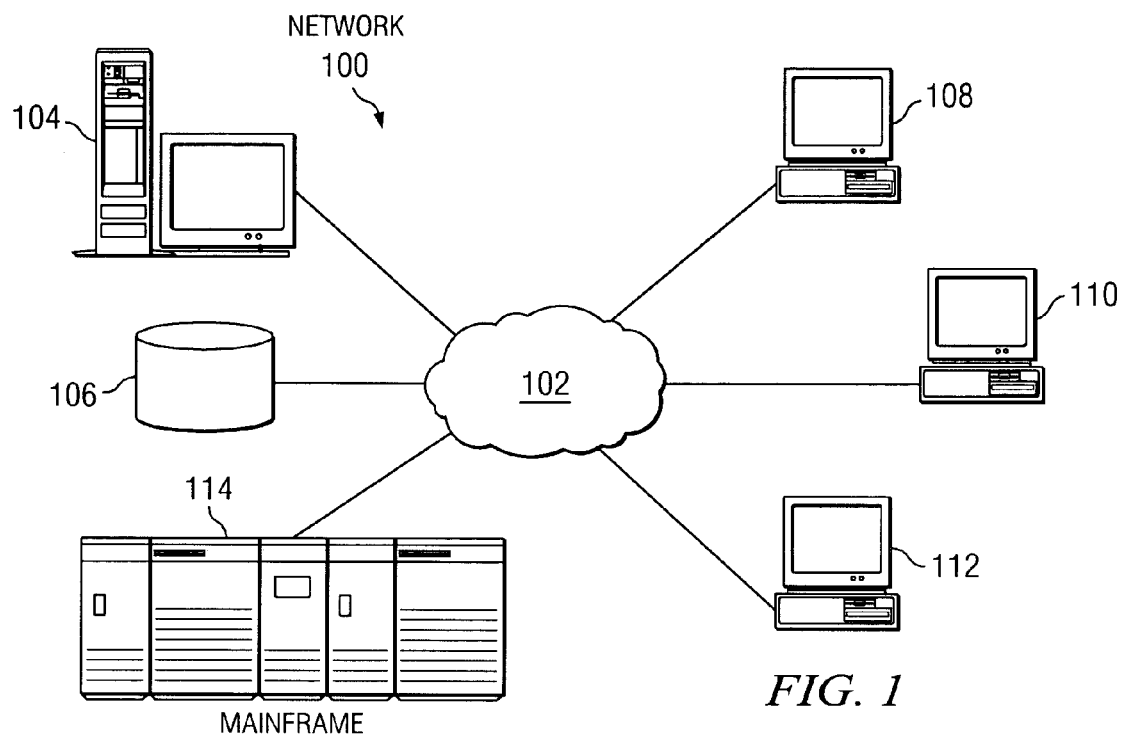
FIG. 1 is an exemplary block diagram of a network computing environment in which the present invention may be implemented.
Figure 2:
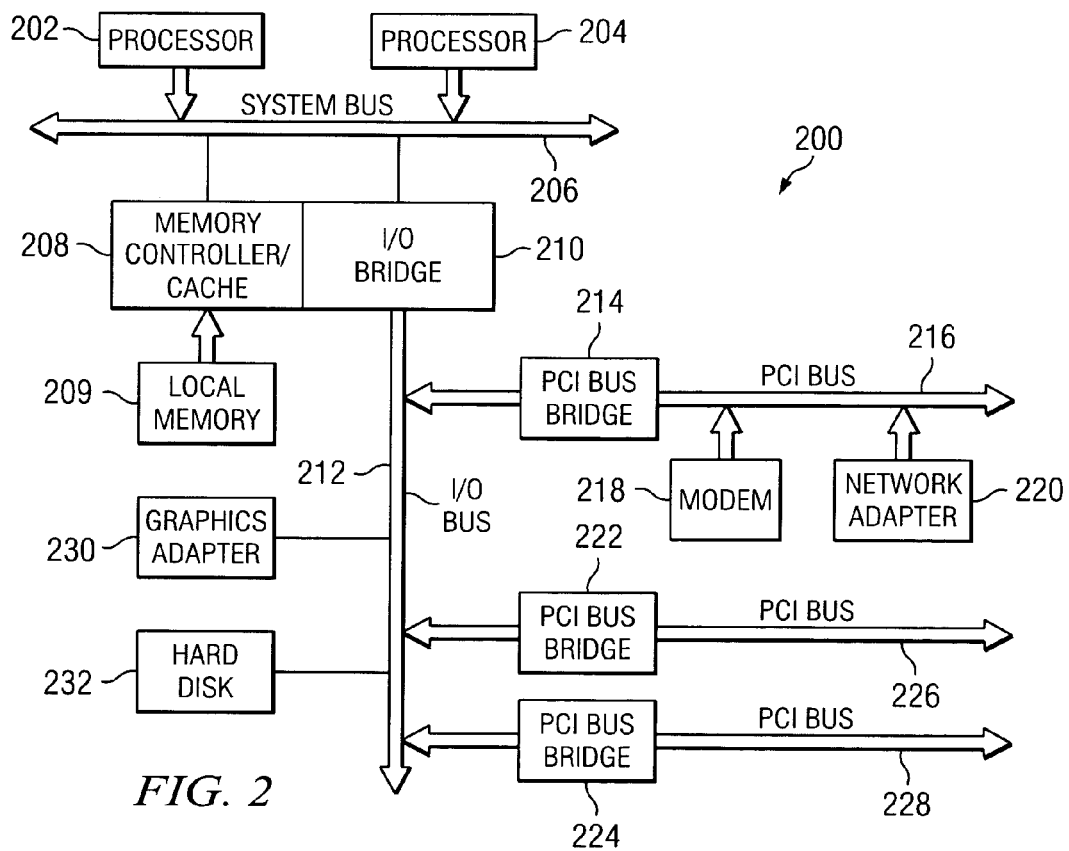
FIG. 2 is an exemplary block diagram of a storage subsystem in accordance with a preferred embodiment of the present invention.
Figure 3:
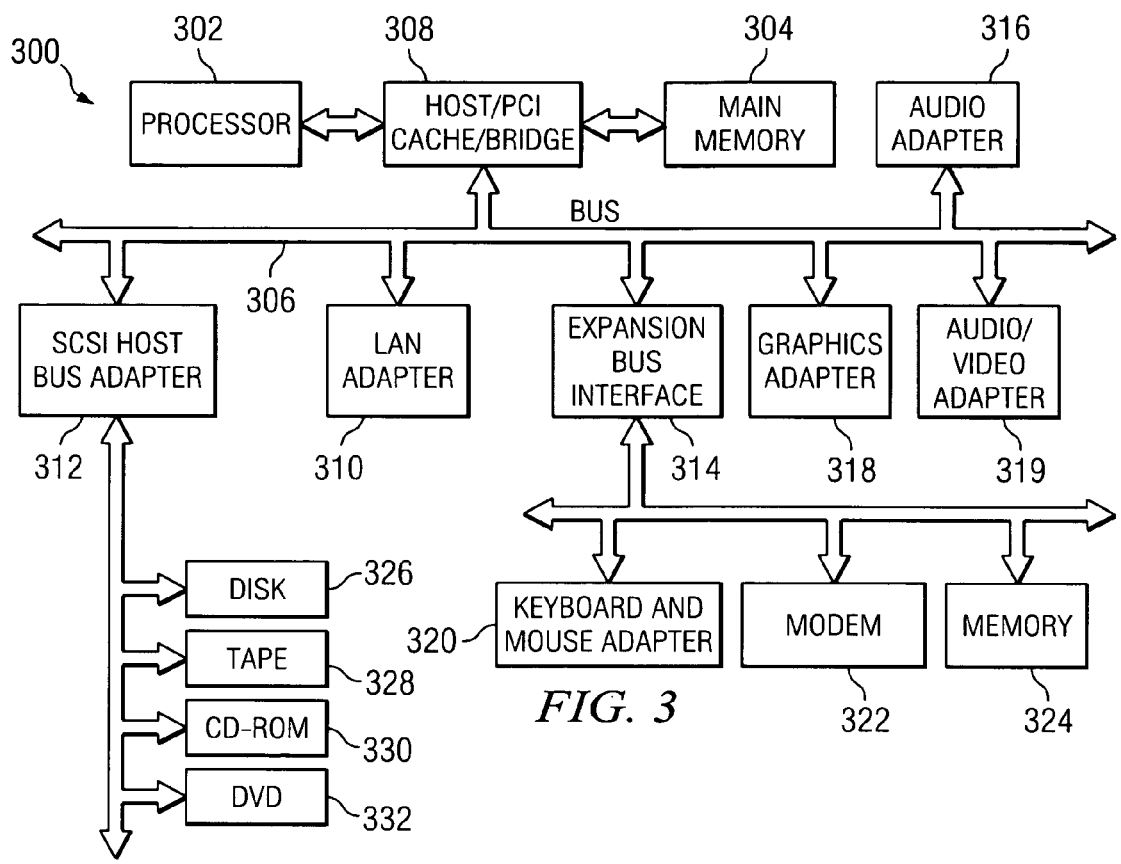
FIG. 3 is an exemplary diagram illustrating a client device in which the present invention may be implemented.

FIGS. 1-3 illustrate a distributed computing environment in which the present invention may be implemented. It should be noted that, in a stand alone computing device embodiment of the present invention, the present invention may be implemented in either the server computing device shown in FIG. 2 or the client computing device shown in FIG. 3, independent of the other computing devices in the distributed data processing system.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with mainframe 114 and storage unit 106. In addition, clients 108, 110, and 112 also are connected to network 102. These clients 108, 110, and 112 may be, for example, personal computers or network computers. In the depicted example, server 104 and mainframe 114 may provide data, such as boot files, operating system images, and applications to clients 108-112. In addition, mainframe 114 may host one or several virtual servers. Clients 108, 110, and 112 are clients to server 104 and mainframe 114. Network data processing system 100 may also include additional servers, clients, and other devices not shown (e.g., printers).

In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary and could indeed be a mainframe architecture rather than the depicted architecture. In addition, other peripheral devices, such as optical disk drives and the like, also may be used in addition to or in place of the hardware depicted. The depicted example is not meant to imply architectural limitations with respect to the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
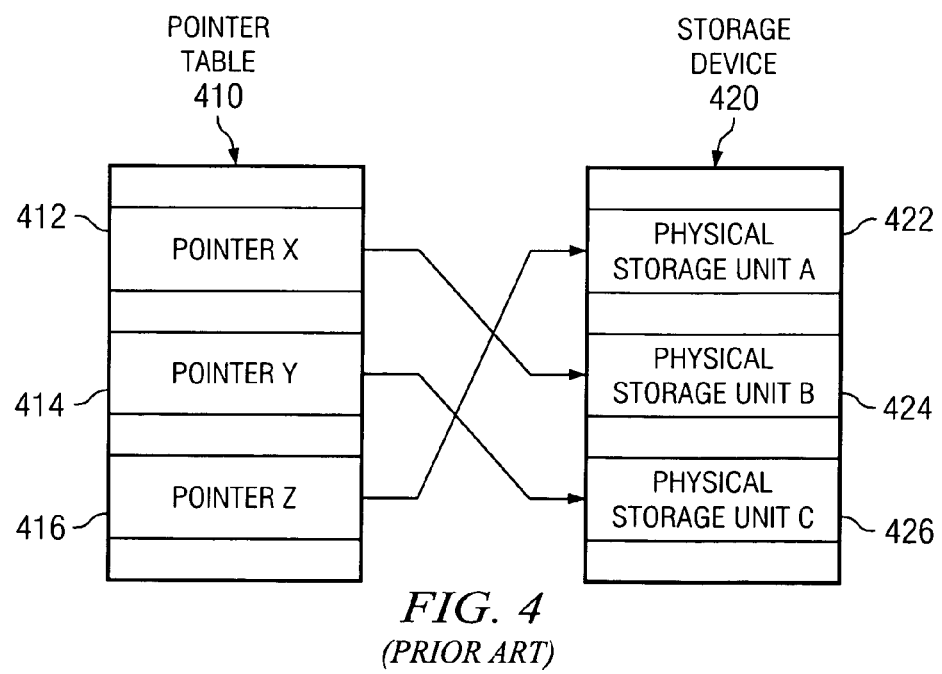
FIG. 4 is an exemplary diagram illustrating a pointer table-storage device model used with the prior art.

FIG. 4 exemplifies the pointer table-data storage model used in the prior art. As shown in FIG. 4, the pointer table 410 includes a plurality of entries 412-416 that point to physical locations 422-426 of a storage device 420 where data corresponding to the pointer table entries 412-416 is stored. Each entry in pointer table 410 is a pointer. The actual physical data is stored in locations 422-426.

Pointer table 400 includes pointers to units of storage of a predetermined size, such as tracks on a disk drive in a storage subsystem. When a calling application wishes to access data on the storage device 420, the calling application looks up the pointer in the pointer table 410 where the pointer corresponds to files the calling application requires. From the pointer retrieved from the pointer table 410, the calling application identifies the addresses of the tracks on which the files reside in the storage device 420 and reads the data from the tracks of the storage device 420.

The pointer table 410 may be obtained, for example, using an instant copy operation or the like. Thus, the pointers depicted in table 410 may be referred to as a "snapshot".

Figure 5:
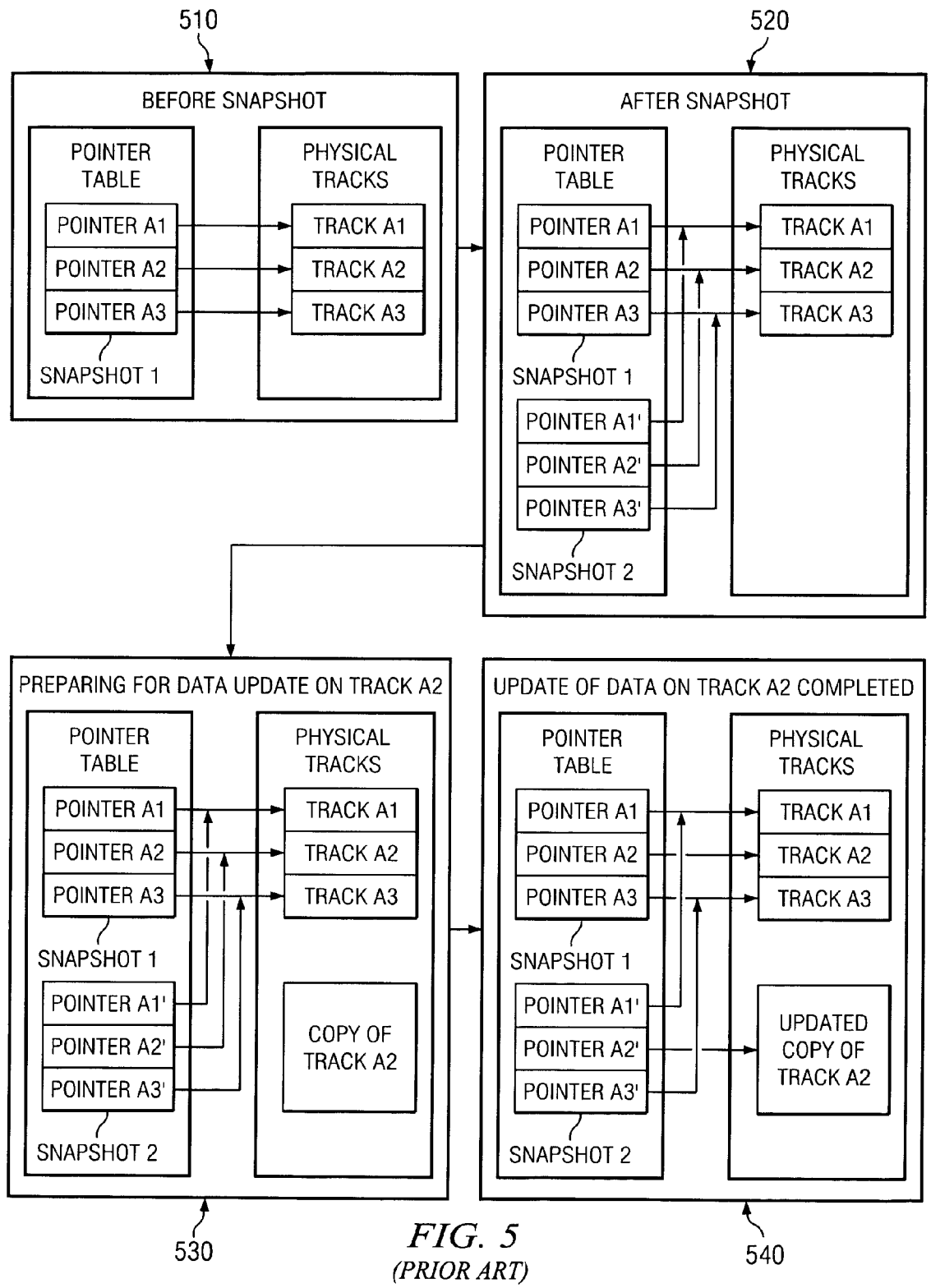
FIG. 5 is an exemplary diagram illustrating an instant copy operation according to the prior art.

FIG. 5 is an exemplary diagram illustrating an example instant copy and data change operation according to the prior art. As shown in FIG. 5, during a first phase 510 of the instant copy operation, pointer entries A1-A3 in the pointer table point to data tracks A1-A3 in which the actual physical data is stored. In a second phase 520, a snapshot copy of the data tracks is generated by creating a virtual copy of the data tracks. This virtual copy of the data tracks A1-A3 is comprised of a copy of the pointers A1-A3 which is denoted as A1'-A3'. Thus, to a user or application making use of the present invention, two versions of the same data appear to exist, but in actuality only one version of the data exists with two sets of pointers pointing to the same physical data tracks.

Thereafter, in a third phase 530, a copy of the data track A2 whose data is to be changed is made in preparation for the changes to the data. The changes to the data will be made to the copy of data track A2 rather than to the original data track A2. Following copying of the data track A2, the copy of the pointer, i.e. pointer A2' is modified to point to the copy of the data track which is updated or changed to reflect the new data. Thus, the second set of pointers A1'-A3'is comprised of pointers A1' and A3' which point to the original tracks A1 and A3. The second set of pointers further includes pointer A2' which now points to the updated copy of track A2. Thus, when a user or application accesses the data in the physical tracks using the set of pointers A1-A3, the data tracks A1-A3 are accessed. When a user or application accesses the data in the physical tracks using the set of pointers A1'-A3', the data tracks A1, A3 and the updated copy of track A2 are accessed.

Figure 6:
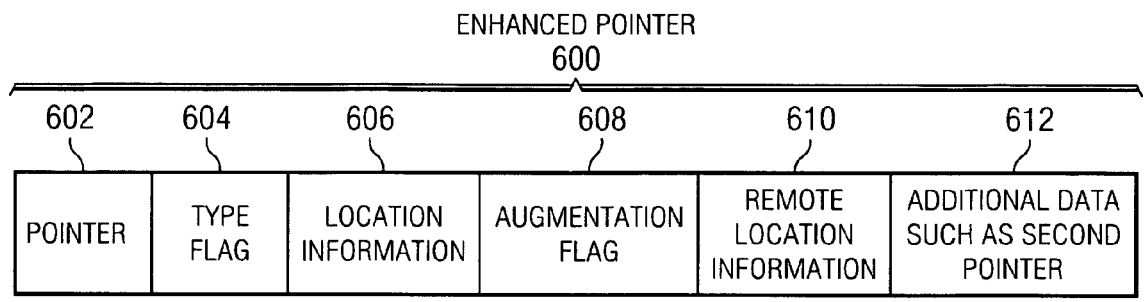
FIG. 6 is a block diagram of an enhanced pointer according to the present invention.

FIG. 6 is a block diagram of an enhanced pointer 600 according to the present invention. Enhanced pointer 600 includes a field 602 in which is stored a pointer address, a field 604 in which is stored a type flag, a field 606 in which is stored location information, a field 608 in which may be stored an augmentation flag, a field 610 in which may be stored remote location information, and a field 612 in which may be stored additional data such as a second pointer.

The type flag indicates the type for enhanced pointer 600. A pointer may be a prime pointer (PP) type of pointer or an enhanced pointer (EP) type of pointer. A PP type of pointer points directly to the physical location in the storage subsystem where the data is stored. Thus, the pointer address stored in field 602 for a PP type of pointer is the storage address where the data is located.

An EP type of pointer points to another pointer instead of directly to a physical storage location. The pointer address stored in field 602 for an EP type of pointer is the storage address where another pointer is located.

A pointer may also be an anchor type of pointer, referred to herein as an anchor pointer. The anchor pointer always points to the latest version of the data. An anchor pointer typically points to the current PP for the data. An anchor pointer does not get moved within the pointer table once the anchor pointer is set up as long as the data element exists in the storage subsystem.

The anchor pointer is typically an EP type of pointer because the anchor pointer points to the PP for the data. However, an anchor pointer may be the PP for the data. Therefore, instead of having a PP and a separate anchor pointer for particular data, there may exist only one pointer that acts as both the PP and the anchor pointer for the data.

Figure 7:
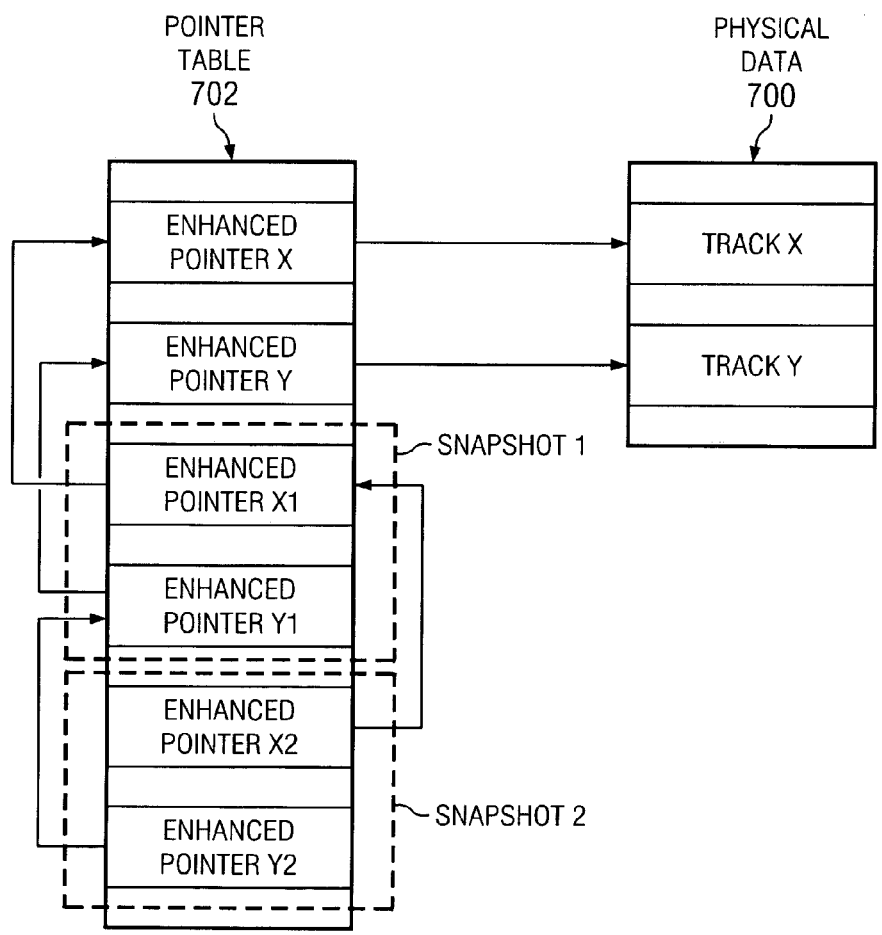
FIG. 7 is an exemplary diagram illustrating cascading snapshot copies using enhanced pointers according to the present invention.

FIG. 7 is an exemplary diagram illustrating cascading snapshot copies using enhanced pointers according to the present invention. Tracks of physical data, such as Track X and Track Y, exist on some physical storage device 700. A pointer table, such as table 702, includes entries in which enhanced pointers are stored. For example, enhanced pointer X points directly to the data stored in Track X in physical device 700. Enhanced pointer Y points directly to the data stored in Track Y in physical device 700.

A snapshot copy can be made of these enhanced pointers, enhanced pointer X and enhanced pointer Y. For example, snapshot 1 has been made which includes enhanced pointer X1 and enhanced pointer Y1. Instead of pointing directly to actual data, these enhanced pointers point instead to other enhanced pointers. Enhanced pointer X1 points to enhanced pointer X which in turn points to Track X. Enhanced pointer Y1 points to enhanced pointer Y which in turn points to Track Y.

A second snapshot copy can also be made. Snapshot 2 has been made which is a snapshot copy of snapshot 1. Thus, enhanced pointer X2 points to enhanced pointer X1 which points to enhanced pointer X which in turn points to Track X. Enhanced pointer Y2 points to enhanced pointer Y1 which points to enhanced pointer Y which in turn points to Track Y.

Figure 8:
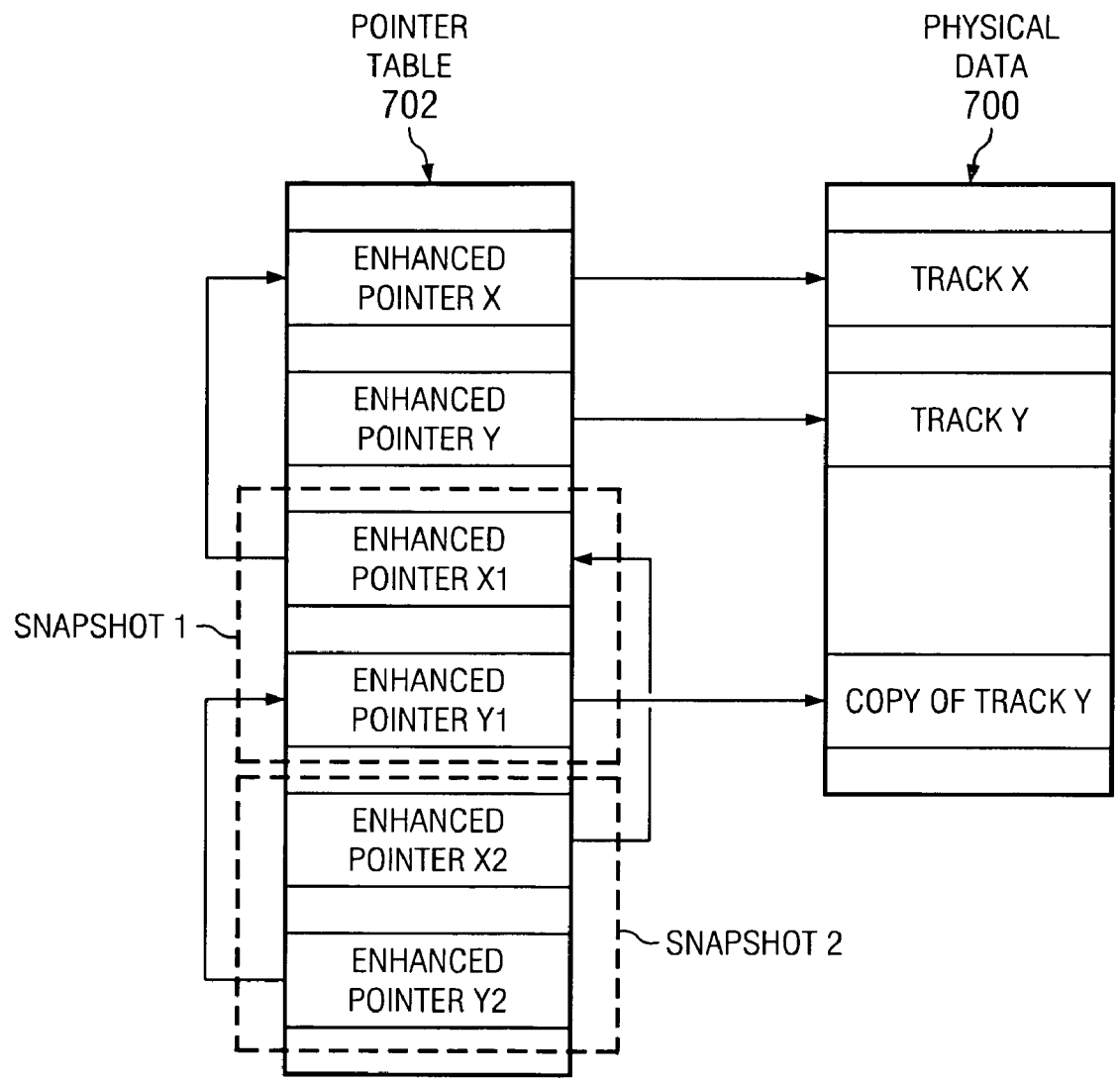
FIG. 8 is an exemplary diagram illustrating cascading snapshot copies using enhanced pointers where one of the enhanced pointers now includes a direct pointer to physical data according to the present invention.

FIG. 8 is an exemplary diagram illustrating cascading snapshot copies using enhanced pointers where one of the enhanced pointers now includes a direct pointer to physical data according to the present invention. FIG. 8 depicts altering enhanced pointer Y1 so that enhanced pointer Y1 now points to a copy of Track Y, instead of to Track Y indirectly through enhanced pointer Y. Prior to enhanced pointer Y1 being altered, its type flag was set to indicate that pointer Y1 was an EP that pointed to another pointer. When enhanced pointer Y1 was altered, its type flag was also altered to indicate that enhanced pointer Y1 is a PP that points directly to actual data instead of to another enhanced pointer.

The pointers of snapshot 2 have not been altered. As a result, enhanced pointer Y2 now points indirectly to Copy of Track Y instead of indirectly to Track Y. Enhanced pointer Y2 points to enhanced pointer Y1 which now points directly to Copy of Track Y.

To illustrate how these snapshot copies could be utilized, consider the following example. Suppose that a file, "corporatelogo.gif", is stored in Track Y of physical data 700. This file can be accessed through enhanced pointer Y, enhanced pointer Y1, or enhanced pointer Y2. These appear to the user to be three separate, independent copies of the same logo file. According to the present invention, a user working with snapshot 1 could change its copy. For example, if the user wanted to change its copy, then the present invention would create a copy of Track Y, i.e. Copy of Track Y. Enhanced pointer Y1, which is part of snapshot 1, would then be altered to point directly to Copy of Track Y instead of to enhanced pointer Y. The direction flag in enhanced pointer Y1 would also be altered to be set to indicate that Y1 now points directly to the data itself instead of to another enhanced pointer. The user then could change Copy of Track Y.

For example, suppose the original file, corporatelogo.gif, were a square-shaped logo, and suppose that the user of snapshot 1 changed the logo to a circular logo. Anyone using enhanced pointer Y would retrieve the square-shaped logo, while users of snapshot 1 and snapshot 2 would retrieve the circular logo.

Figure 9:
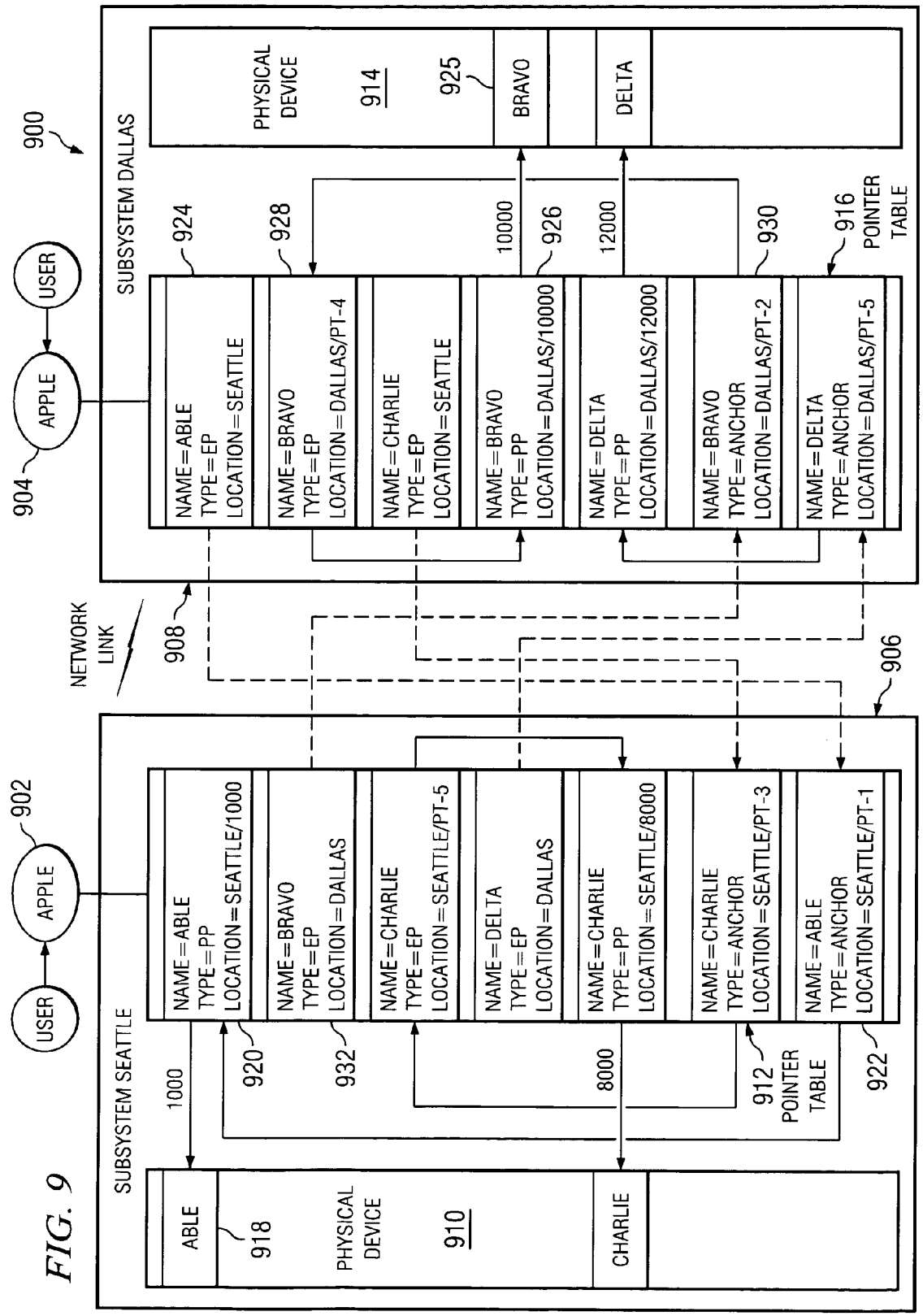
FIG. 9 is a block diagram of a storage system in accordance with the present invention.

FIG. 9 is a block diagram of a storage system 900 in accordance with the present invention. An application, "Apple", is being run in two locations that are geographically remote from each other. Application 902 is being run in a first location, such as Seattle, and application 904 is being run in a second location, such as Dallas. Storage system 900 includes a storage subsystem 906 that is located in the first location, and storage subsystem 908 that is located in the second location. When a user is accessing application 902, storage subsystem 906 is considered to be the local subsystem while storage subsystem 908 is considered to be the remote subsystem. When a user is accessing application 904, storage subsystem 908 is considered to be the local subsystem while storage subsystem 906 is considered to be the remote subsystem.

Each storage subsystem includes a physical storage device where the data is physically stored and a pointer table that is used by the storage subsystem to locate data. For example, subsystem 906 includes physical device 910 where the physical data is stored and pointer table 912. Subsystem 908 includes physical device 914 where the physical data is stored and pointer table 916.

Enhanced pointers that adhere to the format described with reference to FIG. 6 are stored in each pointer table. An enhanced pointer can be a prime pointer (PP) type of pointer that points directly to the physical storage location of a data element. An enhanced pointer can be an enhanced pointer (EP) type of pointer that points to another pointer. An enhanced pointer can be an anchor pointer that always points to the current version of the data element. The anchor pointer points to either a PP for the data element or is the PP for the data element in addition to being the anchor pointer.

For example, a data element "Able" 918 is stored in physical device 910 at storage location 1000. An enhanced pointer 920 has been created in subsystem 906 that is a PP pointer that points directly to Able. Enhanced pointer 920 indicates that it is a PP type of pointer for data element "Able" and identifies its location as the storage location 1000 in the local Seattle subsystem. An enhanced pointer 922 has been created in subsystem 906 that is an EP pointer that points to another pointer instead of to data. Enhanced pointer 922 indicates that it is an EP type of pointer for data element "Able" and identifies its location as the storage location pointer table entry "1" in the subsystem 906. Thus, enhanced pointer 922 points to the local subsystem in which pointer 922 is stored. Enhanced pointer 922 is an anchor pointer. Therefore, all remote systems that include an EP type of pointer to the data element "Able" will point to pointer 922. Anchor pointer 922 is fixed in table 912 and will never move so long as Able is a valid data element in device 910.

An enhanced pointer 924 has been created in subsystem 908 that is an EP pointer that points to another pointer. Enhanced pointer 924 indicates that it is an EP type of pointer for data element "Able" and identifies its location as the subsystem 906. Thus, enhanced pointer 924 points to a subsystem that is remote from the subsystem in which pointer 924 is stored. Enhanced pointer 924 points to the anchor pointer for data element Able in the remote subsystem 906.

A data element "Bravo" 925 is stored in physical device 914 at storage location 10000. An enhanced pointer 926 has been created in pointer table 916 in subsystem 908 that is a PP pointer that points directly to Bravo. Enhanced pointer 926 indicates that it is a PP type of pointer for data element "Bravo" and identifies its location as the storage location 10000 in the local Dallas subsystem 908. An enhanced pointer 928 has been created in subsystem 908 that is an EP pointer that points to another pointer instead of to data. Enhanced pointer 928 indicates that it is an EP type of pointer for data element "Bravo" and identifies its location as the pointer table entry "4" in the subsystem 908. Thus, enhanced pointer 928 points to the local subsystem in which pointer 928 is stored.

An enhanced pointer 930 has been created in subsystem 908 that is an EP pointer that points to another pointer instead of to data. Enhanced pointer 930 indicates that it is an EP type of pointer for data element "Bravo" and identifies its location as the pointer table entry "2" in the subsystem 908. Enhanced pointer 930 is an anchor pointer. Therefore, all remote systems that include an EP type of pointer to the data element "Bravo" will point to pointer 930. Anchor pointer's 930 location is fixed in table 916 and will never move so long as Bravo is a valid data element in device 914.

An enhanced pointer 932 has been created in subsystem 906 that is an EP pointer that points to another pointer. Enhanced pointer 932 indicates that it is an EP type of pointer for data element "Bravo" and identifies its location as the subsystem 908. Thus, enhanced pointer 932 points to a subsystem that is remote from the subsystem in which pointer 932 is stored. Enhanced pointer 932 points to the anchor pointer for data element Bravo in the remote subsystem 908.

Figure 10:
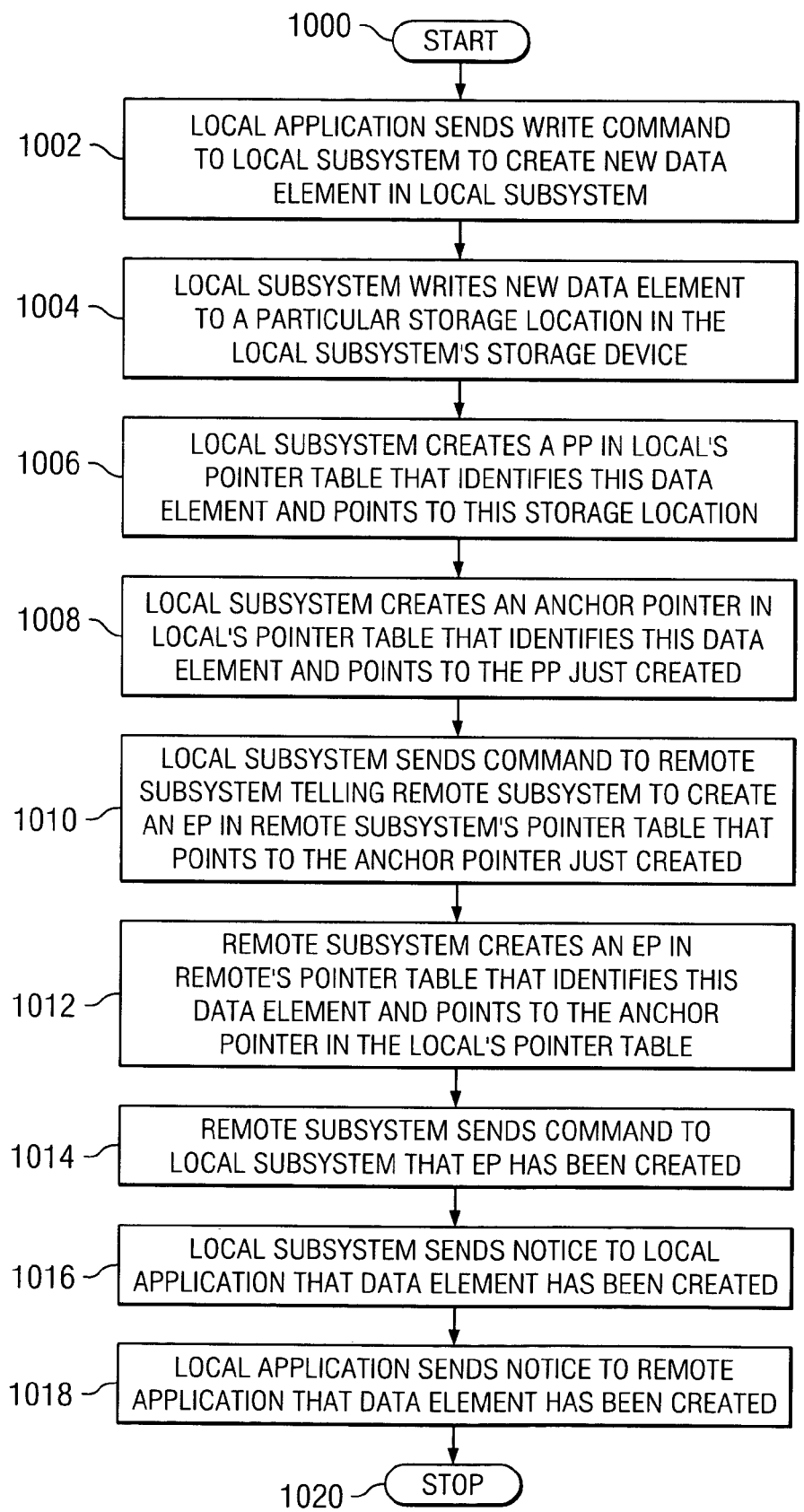
FIG. 10 depicts a high level flow chart that illustrates a local application creating a new data element in the local application's storage subsystem in accordance with the present invention.

FIG. 10 depicts a high level flow chart that illustrates a local application creating a new data element in the local application's storage subsystem in accordance with the present invention. The process starts as illustrated by block 1000 and thereafter passes to block 1002 which depicts the local application sending a write command to the local subsystem to create a new data element in the local subsystem. Next, block 1004 illustrates the local subsystem writing the new data element to a particular storage location in the local subsystem's storage device.

The process then passes to block 1006 which depicts the local subsystem creating a PP type of pointer, in the local subsystem's pointer table, that identifies this data element and points to this storage location. Next, block 1008 illustrates the local subsystem creating an anchor pointer, in the local subsystem's pointer table, that identifies this data element and points to the PP just created. The process passes to block 1010 which depicts the local subsystem sending a command to the remote subsystem telling the remote subsystem to create an EP type of pointer in the remote subsystem's pointer table that points to the anchor pointer just created.

Next, block 1012 illustrates the remote subsystem creating an EP in the remote subsystem's pointer table that identifies this data element and points to the anchor pointer in the local subsystem's pointer table. Thereafter, block 1014 depicts the remote subsystem sending a command to the local subsystem that an EP has been created. Block 1016, then, illustrates the local subsystem sending a notice to the local application that the data element has been created. Then, block 1018 depicts the local application sending a notice to the remote application that a data element has been created. The process then terminates as illustrated by block 1020.

Figure 11:
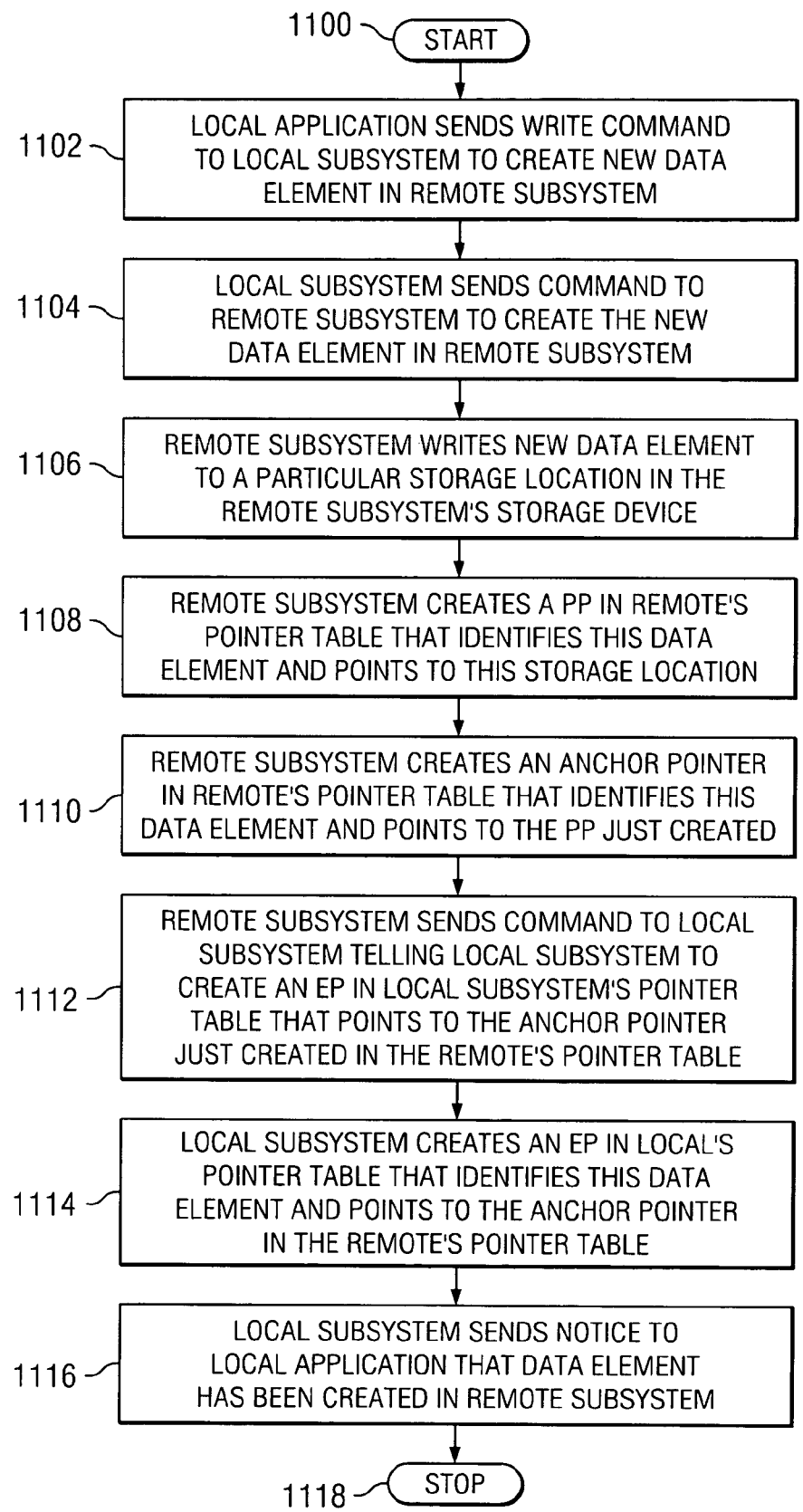
FIG. 11 illustrates a high level flow chart that depicts a local application creating a new data element in the remote application's storage subsystem in accordance with the present invention.

FIG. 11 illustrates a high level flow chart that depicts a local application creating a new data element in the remote application's storage subsystem in accordance with the present invention. The process starts as depicted by block 1100 and thereafter passes to block 1102 which illustrates the local application sending a write command to the local subsystem to create a new data element in the remote subsystem. Next, block 1104 depicts the local subsystem sending a command to the remote subsystem to create the new data element in the remote subsystem.

Block 1106, then, illustrates the remote subsystem writing the new data element to a particular storage location in the remote subsystem's storage device. Thereafter, block 1108 depicts the remote subsystem creating a PP type of pointer in the remote subsystem's pointer table that identifies this data element and points to this storage location. Next, block 1110 illustrates the remote subsystem creating an anchor pointer in the remote subsystem's pointer table that identifies this data element and points to the PP just created.

The process then passes to block 1112 which depicts the remote subsystem sending a command to the local subsystem telling the local subsystem to create an EP type of pointer in the local subsystem's pointer table that points to the anchor pointer just created in the remote subsystem's pointer table. Next, block 1114 illustrates the local subsystem creating an EP in the local subsystem's pointer table that identifies this data element and points to the anchor pointer in the remote subsystem's pointer table.

Thereafter, block 1116 depicts the local subsystem sending a notice to the local application that the data element has been created in the remote subsystem. The process then terminates as depicted by block 1118.

Figure 12:
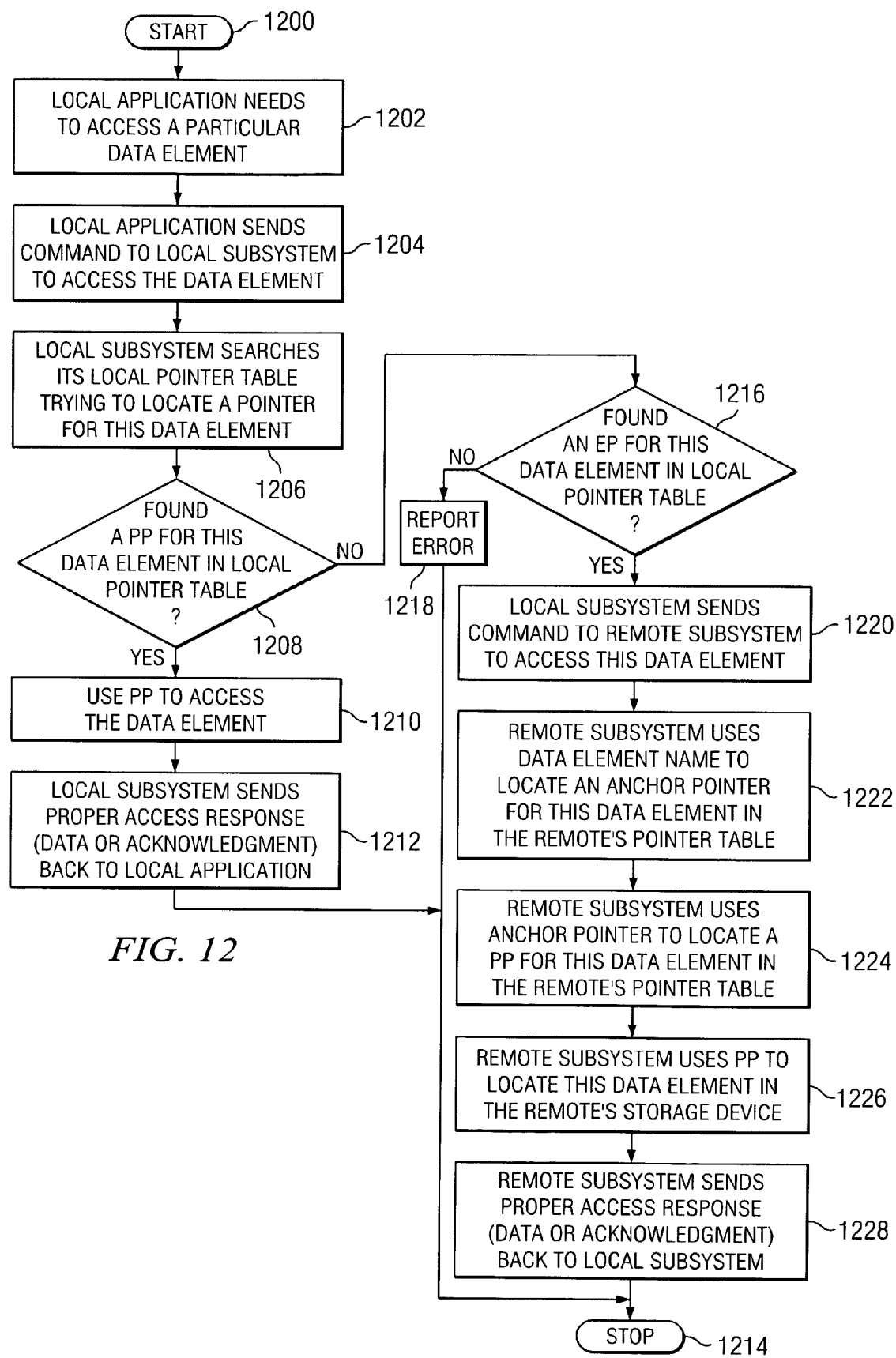
FIG. 12 depicts a high level flow chart that illustrates a local application accessing an existing data element in accordance with the present invention.

FIG. 12 depicts a high level flow chart that illustrates a local application accessing an existing data element in accordance with the present invention. The process starts as depicted by block 1200 and thereafter passes to block 1202 which illustrates the local application needing to access a particular data element. Next, block 1204 depicts the local application sending a command to the local subsystem to access the data element. The access can be a request to read data from a particular data element or write data to a particular data element.

The process then passes to block 1206 which illustrates the local subsystem searching its local pointer table trying to locate a pointer for this data element. Block 1208, then, depicts a determination of whether or not the local subsystem found a PP for this data element in its pointer table. If a determination is made that the local subsystem found a PP for this data element in its pointer table, the process passes to block 1210 which illustrates the local storage subsystem using the PP to access the data element. Next, block 1212 depicts the local subsystem sending the proper access response back to the local application. The proper access response is data when the command was a read command, and an acknowledgement when the command was a write command. The process then terminates as illustrated by block 1214.

Referring again to block 1208, if a determination is made that a PP was not found in the local pointer table, the process passes to block 1216 which depicts a determination of whether or not the local subsystem found an EP for this data element in its pointer table. If a determination is made that the local subsystem did not find an EP for this data element in its pointer table, the process passes to block 1218 which illustrates reporting an error. The process then terminates as depicted by block 1214.

Referring again to block 1216, if a determination is made that the local subsystem did find an EP for this data element in its pointer table, the process passes to block 1220 which illustrates the local subsystem sending a command to the remote subsystem to access this data element. Next, block 1222 depicts the remote subsystem using the data element name to locate an anchor pointer for this data element in the remote subsystem's pointer table.

The process then passes to block 1224 which illustrates the remote subsystem using an anchor pointer to locate a PP for this data in the remote subsystem's pointer table. Thereafter, block 1226 depicts the remote subsystem using the PP to locate this data element in the remote subsystem's storage device. Next, block 1228 illustrates the remote subsystem sending the proper access response back to the local subsystem. The proper response is data when the command was a read command, and an acknowledgement when the command was a write command.

Figure 13:
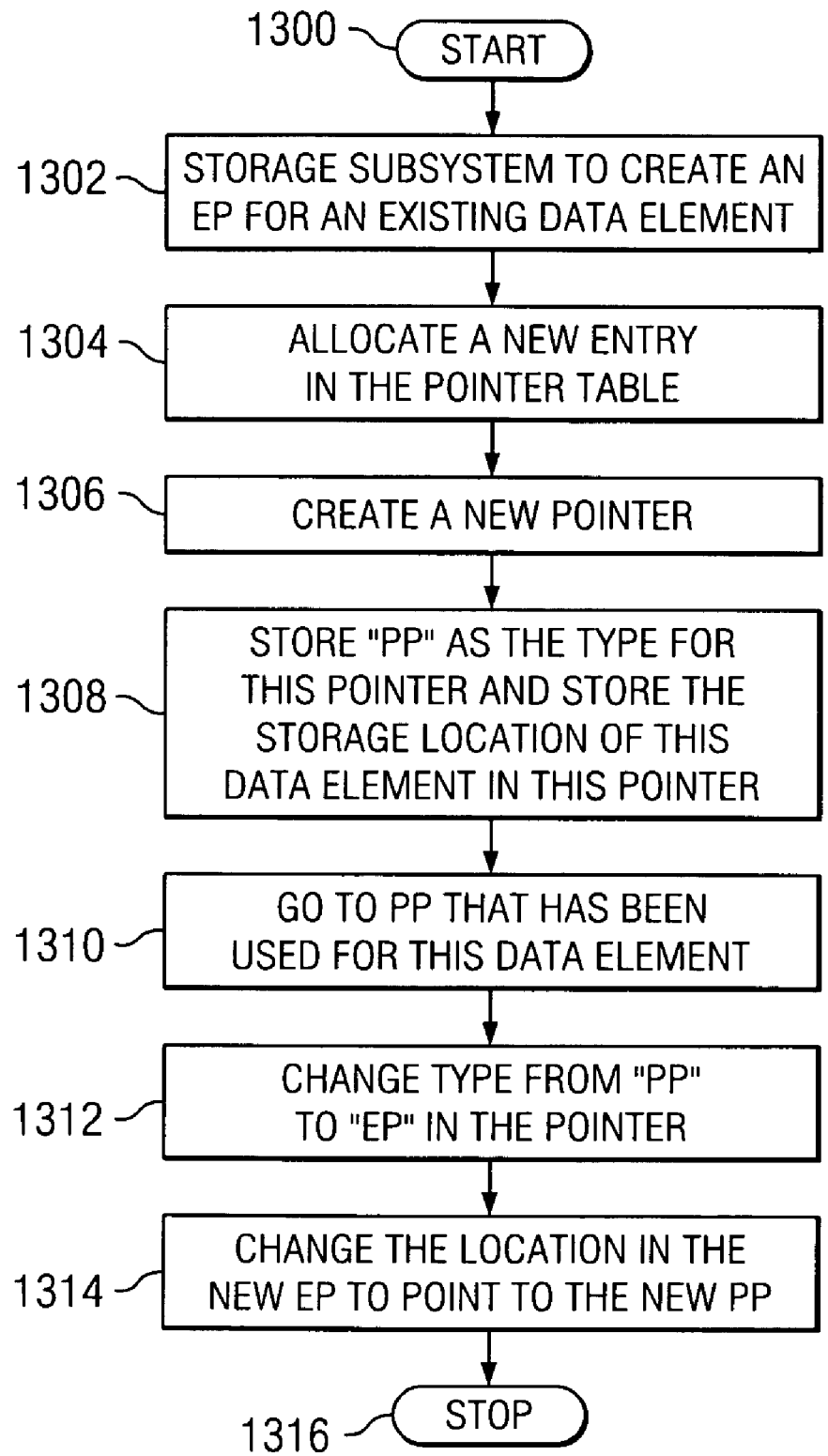
FIG. 13 depicts a high level flow chart that illustrates creating an EP type of pointer in a pointer table for an existing data element for which an EP type of pointer does not already exist in accordance with the present invention.

FIG. 13 depicts a high level flow chart that illustrates creating an EP type of pointer in a pointer table for an existing data element for which an EP type of pointer does not already exist in accordance with the present invention. The process starts as depicted by block 1300 and thereafter passes to block 1302 which illustrates a storage subsystem needing to create an EP for an existing data element in the storage subsystem's pointer table. No EP type of pointer already exists that can be used to traverse the pointer table to locate this data element. Block 1304, then, depicts allocating a new entry in the pointer table.

The process then passes to block 1306 which illustrates creating a new enhanced pointer. Thereafter, block 1308 depicts storing a "PP" as the type for this new enhanced pointer. The storage location in the storage device is stored in the new enhanced pointer.

Block 1310, then, illustrates going to the pointer in the pointer table that had been used as the PP for this data element. The process then passes to block 1312 which depicts changing the type from "PP" to "EP" in this pointer. Next, block 1314 illustrates changing the location in this new EP pointer to the new PP pointer. The process then terminates as depicted by block 1316.

It is important to note that while the present invention has been described in the context of a fully functioning data processing system. Those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for use with first and second systems which are geographically remote from one another, wherein the first system includes a first pointer table and the second system includes a second pointer table, the method comprising:

storing a first subset of data elements including a first data element of a dataset in the first system and storing a second subset of data elements of the dataset in the second system, wherein each data element of the first subset is different from each data element of the second subset;

creating in the first pointer table first and second pointers for the first data element in response to the first data element being stored in the first system in which the first pointer directly points to the first data element and the second pointer directly points to the first pointer; and creating in the second pointer table a third pointer for the first data element in response to the first data element being stored in the first system in which the third pointer directly points to the second pointer.

2. The method of claim 1 further comprising:

executing a first instance of the application locally on the first system such that the first instance requires access to the first data element;

searching the first pointer table for a pointer for the first data element which directly points to the first data element to locate the first pointer; and using the first pointer to provide the first instance with access to the first data element.

3. The method of claim 1 further comprising:

executing a second instance of the application locally on the second system such that the second instance requires access to the first data element;

searching the second pointer table for a pointer for the first data element which directly points to the first data element;

in response to determining that the second pointer table lacks a pointer for the first data element which directly points to the first data element, searching the second pointer table for a pointer for the first data element which directly points to another pointer for the first data element to locate the third pointer;

using the third pointer to locate the second pointer;

using the second pointer to locate the first pointer; and using the first pointer to provide the second instance with access to the first data element.

4. The method of claim 1 further comprising:

executing a first instance of the application locally on the first system such that the first instance requires a new data element to be stored in the first system;

storing the new data element in the first system;

creating in the first pointer table fourth and fifth pointers for the new data element in response to the new data element being stored in the first system in which the fourth pointer directly points to the new data element and the fifth pointer directly points to the fourth pointer; and creating in the second pointer table a sixth pointer for the new data element in response to the new data element being stored in the first system in which the sixth pointer directly points to the fifth pointer.

5. The method of claim 4 further comprising:

executing the first instance such that the first instance requires access to the new data element;

searching the first pointer table for a pointer for the new data element which directly points to the new data element to locate the fourth pointer; and using the fourth pointer to provide the first instance with access to the new data element.

6. The method of claim 4 further comprising:

executing a second instance of the application locally on the second system such that the second instance requires access to the new data element;

searching the second pointer table for a pointer for the new data element which directly points to the new data element;

in response to determining that the second pointer table lacks a pointer for the new data element which directly points to the new data element, searching the second pointer table for a pointer for the new data element which directly points to another pointer for the new data element to locate the sixth pointer;

using the sixth pointer to locate the fifth pointer;

using the fifth pointer to locate the fourth pointer; and using the fourth pointer to provide the second instance with access to the new data element.

7. The method of claim 1 further comprising:

executing a second instance of the application locally on the second system such that the second instance requires a new data element to be stored in the second system;

storing the new data element in the second system;

creating in the second pointer table fourth and fifth pointers for the new data element in response to the new data element being stored in the second system in which the fourth pointer directly points to the new data element and the fifth pointer directly points to the fourth pointer; and creating in the first pointer table a sixth pointer for the new data element in response to the new data element being stored in the second system in which the sixth pointer directly points to the fifth pointer.

8. The method of claim 7 further comprising:

executing the second instance such that the second instance requires access to the new data element;

searching the second pointer table for a pointer for the new data element which directly points to the new data element to locate the fourth pointer; and using the fourth pointer to provide the second instance with access to the new data element.

9. The method of claim 7 further comprising:

executing a first instance of the application locally on the first system such that the first instance requires access to the new data element;

searching the first pointer table for a pointer for the new data element which directly points to the new data element;

in response to determining that the first pointer table lacks a pointer for the new data element which directly points to the new data element, searching the first pointer table for a pointer for the new data element which directly points to another pointer for the new data element to locate the sixth pointer;

using the sixth pointer to locate the fifth pointer;

using the fifth pointer to locate the fourth pointer; and using the fourth pointer to provide the first instance with access to the new data element.

10. A data processing system comprising:

first storage having a first pointer table, wherein the first storage stores a first subset of data elements including a first data element of a dataset; and second storage having a second pointer table, wherein the second storage stores a second subset of data elements of the dataset;

wherein the first storage and the second storage are geographically remote from one another, wherein each data element of the first subset is different from each data element of the second subset;

wherein the first storage creates in the first pointer table first and second pointers for the first data element in response to the first data element being stored in the first storage in which the first pointer directly points to the first data element and the second pointer directly points to the first pointer;

wherein the second storage creates in the second pointer table a third pointer for the first data element in response to the first data element being stored in the first storage in which the third pointer directly points to the second pointer.

11. The system of claim 10 wherein:

in response to a first instance of the application executed locally on the first storage requiring access to the first data element, the first storage searches the first pointer table for a pointer for the first data element which directly points to the first data element to locate the first pointer and uses the first pointer to provide the first instance with access to the first data element.

12. The system of claim 10 wherein:

in response to a second instance of the application executed locally on the second storage requiring access to the first data element, the second storage searches the second pointer table for a pointer for the first data element which directly points to the first data element;

in response to determining that the second pointer table lacks a pointer for the first data element which directly points to the first data element, the second storage searches the second pointer table for a pointer for the first data element which directly points to another pointer for the first data element to locate the third pointer and uses the third pointer to locate the second pointer, and the first storage uses the second pointer to locate the first pointer and uses the first pointer to provide the second instance with access to the first data element.

13. The system of claim 10 wherein:

in response to a first instance of the application executed locally on the first storage requiring a new data element to be stored in the first storage, the first storage stores the new data element and creates in the first pointer table fourth and fifth pointers for the new data element in which the fourth pointer directly points to the new data element and the fifth pointer directly points to the fourth pointer, and the second storage creates in the second pointer table a sixth pointer for the new data element in response to the new data element being stored in the first storage in which the sixth pointer directly points to the fifth pointer.

14. The system of claim 13 wherein:

in response to the first instance requiring access to the new data element, the first storage searches the first pointer table for a pointer for the new data element which directly points to the new data element to locate the fourth pointer and uses the fourth pointer to provide the first instance with access to the new data element.

15. The system of claim 13 wherein:

in response to a second instance of the application executed locally on the second storage requiring access to the new data element, the second storage searches the second pointer table for a pointer for the new data element which directly points to the new data element;

in response to determining that the second pointer table lacks a pointer for the new data element which directly points to the new data element, the second storage searches the second pointer table for a pointer for the new data element which directly points to another pointer for the new data element to locate the sixth pointer and uses the sixth pointer to locate the fifth pointer, and the first storage uses the fifth pointer to locate the fourth pointer and uses the fourth pointer to provide the second instance with access to the new data element.

16. The system of claim 10 wherein:

in response to a second instance of the application executed locally on the second storage requiring a new data element to be stored in the second storage, the second storage stores the new data element and creates in the second pointer table fourth and fifth pointers for the new data element in which the fourth pointer directly points to the new data element and the fifth pointer directly points to the fourth pointer, and the first storage creates in the first pointer table a sixth pointer for the new data element in response to the new data element being stored in the second storage in which the sixth pointer directly points to the fifth pointer.

17. The system of claim 16 wherein:

in response to the second instance requiring access to the new data element, the second storage searches the second pointer table for a pointer for the new data element which directly points to the new data element to locate the fourth pointer and uses the fourth pointer to provide the second instance with access to the new data element.

18. The system of claim 16 wherein:

in response to a first instance of the application executed locally on the first storage requiring access to the new data element, the first storage searches the first pointer table for a pointer for the new data element which directly points to the new data element;

in response to determining that the first pointer table lacks a pointer for the new data element which directly points to the new data element, the first storage searches the first pointer table for a pointer for the new data element which directly points to another pointer for the new data element to locate the sixth pointer and uses the sixth pointer to locate the fifth pointer, and the second storage uses the fifth pointer to locate the fourth pointer and uses the fourth pointer to provide the first instance with access to the new data element.

* * * * *